June 8, 1965
B. F. LOEWEN
3,187,487
CARBON BLACK FILTER
Filed Dec. 26, 1961
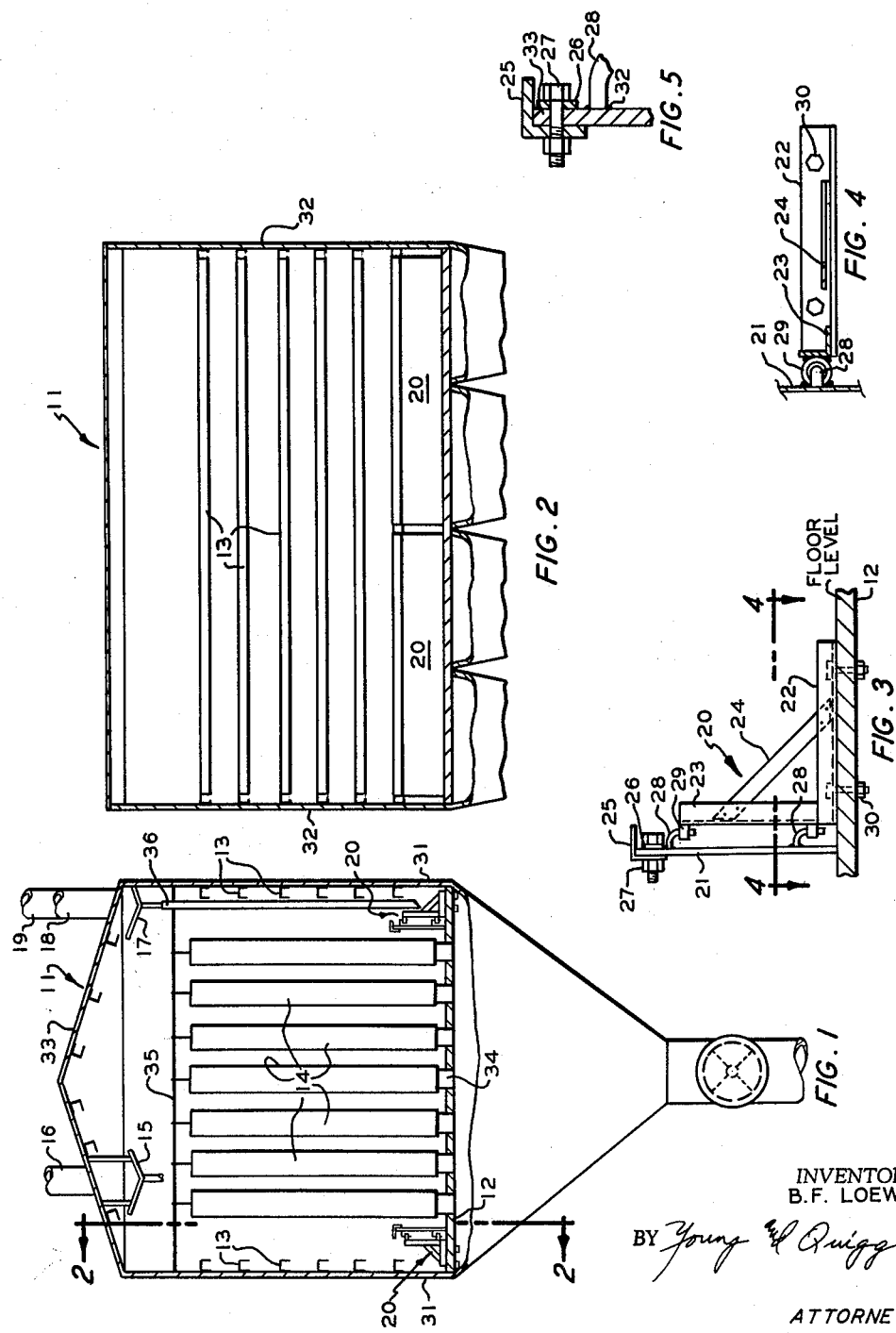
INVENTOR.
B. F. LOEWEN
BY *Young & Quigg*
ATTORNEYS

United States Patent Office 3,187,487
Patented June 8, 1965

3,187,487
CARBON BLACK FILTER
Bruno F. Loewen, Borger, Tex., assignor to Phillips
Petroleum Company, a corporation of Delaware
Filed Dec. 26, 1961, Ser. No. 161,937
3 Claims. (Cl. 55—341)

This invention relates to the separation of carbon black from gases containing suspended carbon black. In one aspect it relates to the separation of carbon black from gases containing suspended carbon black and moisture in bag filters. In another aspect it relates to means for lengthening the service life of filter bags used in the separation of carbon black from carbon black containing furnace gases by maintaining the bags dry during down time as well as on stream time. In yet another aspect it relates to means for lengthening the service life of filter bags used in such an operation by preventing condensate moisture containing soluble salts from contacting such filter bags.

In the art of producing carbon black in reactor furnaces, a hot gaseous effluent containing suspended carbon black is produced at temperatures generally in the neighborhood of about 1200° F., although at some points in the reactor during the carbon black production process, temperatures as high as 2000°–4000° F. may be attained. It is customary to cool the effluent gases containing the carbon black from the reactor furnaces to temperatures from about 280° to about 500° F. prior to separation of the black from the gases. Most of the cooling is by water quenching. One means of separating carbon black from furnace gases is to pass the gases through bag filters. Bag filters are quite efficient for separation of the black when compared to the older electrostatic separation processes. Furthermore, the use of bag filters permits separation of substantially all of the carbon black from the gases. Heretofore, bag filters were used for the most part for smoke abatement where the major portion of the carbon black was separated by the electrostatic process. However, more recently, the bag filters are employed for separating all of the black from the gases. The filter bags are ordinarily made of fabric of one type or another. Such fabrics as textiles, for example, wool, and fabrics woven from synthetic fibers, such as Orlon, and most recently woven glass are used for filter bags. When using Orlon bags, a serious problem presents itself. The Orlon fibers require that the carbon black containing gases must be cooled to a temperature of at least 280° F. to prevent damage to the fibers. When using glass fabric bags, considerably higher temperatures can be tolerated. For example, glass fabric bags can be operated at temperatures from about 450° F. to as high as 600° F. However, ordinarily, such a maximum temperature is not employed.

For cooling the furnace effluent from its water quenched outlet temperature of about 1200° F., in some instances, the effluent is passed through a long length of steel pipe which serves as an atmospheric cooler. Also, additional water is sprayed into the carbon black containing gases to expedite cooling. In any event, water spray near the outlet end of the furnace which reduces the temperature from reaction temperature to about 1200° F. and further addition of water by spraying to reduce temperatures to between about 450° and 600° F., place considerable water vapor in the carbon black containing gases. The presence of large quantities of moisture in the carbon black containing furnace gases presents problems when employing bag filters for separation and recovery of the black.

When bag filters are employed for separating all of the carbon black from the furnace gases, the filters frequently are operated on a time cycle basis. This type of operation is required because bags are ordinarily cylindrical in shape and the gases containing the black are introduced into the bottom open end of the bags and flows outward through the walls thereof. With limited diameters, after a bag is on stream for a length of time, it tends to fill up with carbon black and the thicker the layer of carbon black on the inner surface of the filter bag wall the greater is the pressure drop through the layer of black. After deposition of a substantial layer of carbon black on the inner surface of the wall, the flow of gases and black is terminated and a black-free gas is forced or passed in reverse direction through the bags. The passage of a gas in this direction loosens the black from the inner wall surface and allows the black to fall downward into hoppers placed below the filter bags. During these back-flow periods, the back flow gas is not the hot furnace effluent gases and the filter houses tend to cool. When this cooling occurs the temperature may be lowered to a temperature below the dew point of the gases and under such conditions moisture condenses on the side walls and structural members supporting the side walls and drips to the floor of the bag house. This dripping water splashes on bags positioned adjacent the drip. Any portion of a filter bag which becomes wet does not properly operate as a filter. Furthermore, it has been found that carbon black contacting a wet area of a filter bag adheres to this wet area and on back flow of gases carbon black is not properly removed from the filter bag. Also, it was found that drip condensate which splashed from the floor of the bag house and contacted the lower portions of the filter bags when evaporated upon placing the filter cell in operation formed a hard crust on the bags. Crusts were evident on the inner wall surfaces of the bags as well as on the outer wall surfaces. It was further found that this crust was at least in part ferrous sulfate. Obviously, carbon black should not contain such extraneous material. During back flow cycles, various amounts of this crust broke off from the inner wall surface of the bags and were removed with the carbon black.

Also, bag wall areas, covered with such a crust, are inoperable as carbon black filters. After prolonged use the lower walls of the bags near the filter house outside walls became inoperative and filter capacity was markedly reduced. On inspection, ferrous sulfate crusts were found on bags irrespective of the materials of which the bags were made. In one instance, Fiberglas fabric bags were used and in another instance, woven Orlon fabric bags were used. Thus, in order to maintain maximum throughput of the filter cell arrangement, a bag which becomes undesirably coated or impregnated with such ferrous sulfate must be removed, discarded and replaced with a new filter bag. Such filter bags are quite expensive pieces of equipment. For this reason, means were searched for eliminating the ferrous sulfate problem.

Moisture from the carbon black containing gases can condense on any of the cool surfaces in the interior of the filter cells. Moisture condenses during down time when the filter cells cool sufficiently, that is, to a temperature below the dew point. Also, moisture condenses on starting up of the filtering operation when the filter cell has been down for a period of time and has cooled. During extended down periods of time when air containing moisture enters these filter cells, condensate can form on the cool metal surfaces.

An object of this invention is to devise apparatus for permitting filter bag separation of carbon black without experiencing the ferrous sulfate problem. Another object of this invention is to provide apparatus for preventing the dripping of condensate from splashing against the lower outer surfaces of the filter bag. Yet another object of this invention is to provide apparatus for preventing condensate splashes from dripping condensate from contacting the outer row of filter bags. Still another object of this invention is to provide relatively simple, inexpensive and easy to install apparatus for carrying out these objects. Other objects and advantages of this invention will be realized upon reading the following description which, taken with the attached drawing, forms a part of this specification.

In the drawing, FIGURE 1 illustrates, in diagrammatic form, an end elevational view of a filter cell provided with the apparatus of this invention. FIGURE 2 is a sectional view, taken on the line 2—2 of FIGURE 1. FIGURE 3 is an elevational view, partly in section, of a portion of the apparatus illustrated in FIGURES 1 and 2. FIGURE 4 is a sectional view taken on the line 4—4 of FIGURE 3. FIGURE 5 is a sectional view on an enlarged scale of a portion of the apparatus illustrated in FIGURE 3.

In FIGURE 1, reference numeral 11 refers to a filter bag house or a filter cell such as used when filtering carbon black from furnace effluent gases. This bag house 11 is provided with side walls 31, a floor 12, and a roof 33. The side walls 31 are usually constructed of sheet metal of one type or another and on the inner surface of these side walls are positioned a plurality of channel irons frequently called girts or girt members 13. In the floor 12 is positioned a plurality of openings 34 to which are fitted filter bags such as Fiberglas filter bags 14 for filtering the carbon black. The upper ends of these filter bags are closed and are supported by a support means 35, the details of which are not pertinent to this invention. Extending through the roof 33 of the filter cell are stacks 16, 18, and 19. Since these stacks also cool off during down time of the filter cell, condensate can form within these stacks. Accordingly, in one instance a drip tray 15 is suspended under stack 16 while a drip tray 17 is positioned under stacks 18 and 19 for collecting and diverting dripping condensate which in many instances contains the above mentioned ferrous salts. Drip tray 17 conducts drippings into a drain pipe 36 for disposal while drip tray 15 passes its collected drippings into a pipe, not shown.

The girt members 13 are positioned in a horizontal manner along the inner wall surfaces of the side walls 31. Since the side walls 31 in some instances are exposed to atmospheric temperatures, these girts which contact the side walls also are cooled by conduction through the metal of walls 31. Thus, in many instances, these girt members become cooled to temperatures below dew point temperatures of the atmosphere within the filter cell. When such conditions exist, upon starting up of an operation the moisture laden gases entering the filter cell contact these cool metal surfaces and moisture condenses thereon. Drippings of condensate from the girts at their surfaces remote from the side walls 31 drop to the floor 12 of the cell. Drops of water that fall appreciable distances, cause splashing. This splashing wets the bag surface appreciable distances from the points at which the water droplets impinge against the floor. In this case condensate droplets dropping against the floor 12 splash and splashings impinge against mainly the outer row or rows of the filter bags.

In a copending application, Serial No. 134,420, filed August 28, 1961, there is illustrated conventional positioning of filter bags in a carbon black filter cell. In this copending application a filter cell is disclosed as containing a plurality of rows of filter bags specifically positioned in such a manner that the bags are positioned at the corners of geometric squares.

In order to prevent contacting of the condensate splash with the outer row or with any row of filter bags a splash shield broadly identified in FIGURES 1 and 2 by reference numeral 20 and specifically shown in structure in FIGURES 3, 4 and 5. This splash shield in one instance was about 18" in height and was positioned in a manner parallel to the adjacent wall of a filter cell and was positioned between the point at which condensate droplets impinge against the floor of the cell and the closest row of filter bags. These splash plates 20 or splash shields are preferably positioned near and parallel to any wall of a filter cell, particularly an outside wall. In many instances a filter house is composed of a number of filter cells, such as that illustrated in FIGURES 1 and 2, placed end to end and adjacent each other. Obviously a wall of a filter cell which is adjacent and is common to another filter cell will not cool as much as a wall which is an outside wall, that is one exposed to atmospheric temperature.

This splash shield 20 as mentioned is illustrated in detail in FIGURES 3, 4 and 5. The shield proper comprises a splash plate 21 maintained in an upright position and parallel to a row of filter bags nearest an outside wall of the filter cell. The bottom edge of the splash plate 21 rests on the floor 12 of the cell while its upper end extends upward approximately 18 inches. To support this splash plate in its vertical position there is provided an angle iron base member 22 to which is attached an upright angle iron 23. These two angle irons which join each other at right angles can be welded together at the point of juncture or riveted or bolted as desired. A diagonal brace bar member 24 is provided as illustrated. One of the flat surfaces or web surfaces of angle iron 23 is positioned facing the splash plate 21. At the point at least near the top end of angle iron 23 and at a position near the bottom end thereof there are welded a pair of rings 29. These rings can if desired merely be short lengths of pipe. These rings are welded preferably to the angle iron 23. At the upper elongated edge of splash plate 21 there is attached an angle iron member 25 throughout the length of this upper edge for plate reinforcement purposes. This angle iron is attached to the side of plate 21 adjacent the filter bags while on the opposite side of the plate there is positioned a length of strap iron 26 also for reinforcement purposes. This angle iron and strap iron are attached to the plate 21 by several bolts 27 positioned at spaced distances throughout the horizontal length of the splash plate. In one instance when the splash plate was 9 feet 4 inches in length there were positioned three of these bolts 27 for maintaining the angle iron 25 and strap 26 in position. The bolts were of stainless steel. Immediately under the strap 26, which in this case was a strap iron 1 inch in width and one-eighth inch thick, there was attached as by welding a hook 28 as illustrated. Near the lower end of the splash plate 21 another hook 28 was welded. These hooks were so positioned on the surface of the splash plate 21 that when the bottom edge of the splash plate rested on floor 12 the hooks extended through the openings in the rings 29. In order to hold the angle iron support members rigidly to the floor 12 of the filter cell bolts 30 are employed as illustrated.

This construction permits easy removal of the splash plate member 21 merely by lifting the plate and thereby lifting the hooks 28 from the rings 29. In this manner it is a very simple matter to remove the splash plates 21 for easy access in maintenance operations. In FIGURE 5, is illustrated, on an enlarged scale, the construction at the upper edge of the splash plate assembly. FIGURE 4 illustrates a plan view taken on the line 4—4 of FIGURE 3 and shows the appearance of the hook 28 inserted into the ring 29 when looking downward upon this assembly.

In one instance as mentioned, the splash plates 21 were 9 feet and 4 inches in length and the filter cell in which this assembly was installed was of sufficient length to require two of these splash plates 21 positioned end to end. The center line of the row of filter bags nearest the wall was 31 inches from the inner surface of the wall. The surface of the splash plate assembly facing this row of bag filters was 10 inches to the center line of the filters. The center line of the support apparatus illustrated in FIGURES 3, 4 and 5 was about 1 inch from the ends of splash plates 21 at the point at which the two splash plates were adjacent each other, that is, in the center of the long dimension of a filter cell while at the opposite ends of the splash plates the support members of FIGURES 3, 4 and 5 were positioned at some slightly greater distances from the ends of the plates 21. These greater distances were about 8 inches. The angle irons 22 and 23 were 1½ inches on each side while the rings 29 were made of ¾-inch pipe and were 1½ inches in length. The pins 28 were made of ⅝-inch rod material. The bolts 27 were ½-inch stainless steel bolts with three bolts employed on each section of splash plate 21. The 1 x ⅛-inch strap material 26 was welded at several points along or near the top edge of the splash plates 21. The reinforcement angle irons 25 were 1-inch irons.

The channel iron purlins and the roof of the filter cells are heated sufficiently rapidly when hot gases are passed through the bags following a down period that moisture substantially does not condense on them. Thus, there is little to no problem relative to water dripping from the purlins. The girts around the sidewalls and the sidewalls heat up very slowly thereby providing considerable time, for example, several hours, in which condensate can form on the sidewalls and girts.

In some instances, some of the sidewalls are provided with insulation outside of the interior metal walls. Such insulation tends to retard still further the heating up of the sidewalls thereby lengthening the time during which condensate can form on the sidewalls.

While certain embodiments of the invention have been described for illustrative purposes, the invention obviously is not limited thereto.

I claim:
1. A bag filter system for separating carbon black from gases containing carbon black in suspension comprising, in operable combination, an enclosure having a floor, a plurality of walls and a roof, a plurality of openings in said floor, a separate filter bag having an open end fitting each opening and extending upward in said enclosure with its upper end terminating below said roof, means intermediate the top ends of the filter bags and the roof retaining said bags in an upright position, at least one of said walls having a girt member provided with a vertically downward projection from its innermost portion attached to the inner surface thereof, are upright splash plate positioned parallel to said at least one of said walls intermediate said filter bags and said vertically downward projection of said girt member for protecting said filter bags from splashing aqueous liquid, resulting from condensation of moisture on said girt member and dripping of the aqueous liquid onto said floor.

2. In a bag filter for separating carbon black from effluent gas from a carbon black furnace, said gas containing a substantial concentration of water vapor, comprising an enclosure having a floor, at least one upright metal side wall at the periphery of said floor, and a roof; a plurality of rows of openings in said floor each having an upright filter bag communicating therewith and suspended thereabove in corresponding rows under said roof; at least one girt member extending along said wall generally parallel with said floor; the improvement comprising: a generally upright splash plate adjacent said floor intermediate said wall and the row of bags nearest said wall and spaced from said wall more than the width of said girt to shield said bags from splashing aqueous liquid when condensation occurs on said girt member and liquid condensate drips onto said floor.

3. The bag filter of claim 2 wherein said enclosure comprises a plurality of side walls around the periphery of said floor.

References Cited by the Examiner

UNITED STATES PATENTS

| | | | |
|---|---|---|---|
| 1,194,407 | 8/16 | Martin | 98—99.1 |
| 1,457,303 | 6/23 | Higgins | 189—37 |
| 1,509,912 | 9/24 | Stebbins | 55—304 |
| 2,871,978 | 2/59 | Webster | 55—273 |

REUBEN FRIEDMAN, *Primary Examiner.*

HARRY B. THORNTON, *Examiner.*